United States Patent
Schneider

(10) Patent No.: US 9,646,401 B2
(45) Date of Patent: *May 9, 2017

(54) SYSTEM AND METHOD FOR IMPLEMENTING A DYNAMIC MEDIA LINK

(71) Applicant: Dialogic Corporation, Montreal (CA)

(72) Inventor: Mark A. Schneider, Crystal Lake, IL (US)

(73) Assignee: Dialogic Corporation, Montreal (CA)

( * ) Notice: Subject to any disclaimer, the term of this patent is extended or adjusted under 35 U.S.C. 154(b) by 8 days.

This patent is subject to a terminal disclaimer.

(21) Appl. No.: 14/696,620

(22) Filed: Apr. 27, 2015

(65) Prior Publication Data

US 2015/0235403 A1     Aug. 20, 2015

Related U.S. Application Data

(63) Continuation of application No. 12/420,392, filed on Apr. 8, 2009, now Pat. No. 9,049,478.

(51) Int. Cl.
| | | |
|---|---|---|
| *G06F 15/173* | (2006.01) | |
| *G06T 11/60* | (2006.01) | |
| *G06F 3/0484* | (2013.01) | |

(52) U.S. Cl.
CPC .......... *G06T 11/60* (2013.01); *G06F 3/04842* (2013.01); *G06F 2203/04804* (2013.01)

(58) Field of Classification Search
None
See application file for complete search history.

(56) References Cited

U.S. PATENT DOCUMENTS

| | | |
|---|---|---|
| 6,584,509 B2 | 6/2003 | Putzolu |
| 2002/0056136 A1 | 5/2002 | Wistendahl et al. |
| 2002/0143956 A1 | 10/2002 | Tanimoto |
| 2002/0167911 A1 | 11/2002 | Hickey |
| 2003/0221008 A1 | 11/2003 | England et al. |
| 2005/0021958 A1 | 1/2005 | Park et al. |
| 2006/0010206 A1 | 1/2006 | Apacible et al. |

(Continued)

OTHER PUBLICATIONS

Smith et al. "An Extensible Object Tracking Architecture for Hyperlinking in 2002. Real-time and Stored Video Streams". Apr. 24, 2002.*

(Continued)

*Primary Examiner* — Scott B Christensen
(74) *Attorney, Agent, or Firm* — Chapin IP Law, LLC

(57) ABSTRACT

Systems and methods that provide a facility for a dynamic media overlay. An end user provides data for the dynamic media overlay that is activated upon selection to permit end users to share information while receiving or sending video data. The overlay may be a hyperlink that can be selected to take an action indicated by information provided in the hyperlink. The hyperlink may be represented by audio or image information in the form of instructions or clickable "targets." A content of information represented by the hyperlink can be dynamic so that selection of the hyperlink can result in different actions, depending upon the informational content. One or more flags may be provided to indicate that a new hyperlink or new informational content for a hyperlink is requested. The hyperlink may be provided in an overlay represented as a media layer, or may be embedded in the video media itself.

8 Claims, 5 Drawing Sheets

(56) References Cited

U.S. PATENT DOCUMENTS

2007/0242066 A1   10/2007   Levy Rosenthal
2008/0066103 A1    3/2008   Ellis et al.
2008/0300967 A1   12/2008   Buckley et al.

OTHER PUBLICATIONS

"Editing a Hyperlink in Microsoft Word." Posted at <http://wordprocessing.about.com/od/formattingdocument1/qt/editlink.htm>. Sep. 10, 2007.*
<http://mashable.com/2008/09/15offline-website-reading/>, Sep. 15, 2008.
"Video-on-demand system matches ads to viewers", http://news.yahoo.com/s/nm/20090304/media/nm/us_zillion_1.
http://www.overlay.tv/learn/faq.

* cited by examiner

SYSTEM AND METHOD FOR IMPLEMENTING A DYNAMIC MEDIA LINK

CROSS REFERENCE TO RELATED APPLICATIONS

This application is a continuation of U.S. patent application Ser. No. 12/420,392 filed Apr. 8, 2009 entitled SYSTEM AND METHOD FOR IMPLEMENTING A DYNAMIC MEDIA LINK.

BACKGROUND

The presently disclosed system and method relate generally to selectable indicia provided as a media overlay, and more particularly to selectable indicia with underlying links provided as a dynamic overlay for media streams such as video.

Numerous electronic devices are available that permit various types of media forms to be provided to an end user. Electronic devices are also available to permit the end user to provide responses to another party using various forms of input, including different forms of media. Examples of such electronic devices include hand held or mobile telephones, personal digital assistants (PDAs), televisions and other communication equipment. Some types of electronic devices for communication are specific to a particular kind of media. For example, telephone communications have been implemented to permit end users to exchange audio information. Television communications have been implemented to permit end users to receive video composed of images and audio content. Some television communication systems permit end users to provide feedback or responses to another party, such as a broadcaster or other data collector, often based on the content of the television video.

Video communication devices have also been implemented that permit end users to share video information, such as in the way of a conversation or conference. Some of these electronic devices are implemented to operate in a digital mode, where digital information is exchanged over a telecommunication network to realize the video communication between the electronic devices. For example, a packet-switched network can route packets of digital information between end users to provide a communication network for sharing video information. A typical protocol used for routing packets in such a network is the transmission control protocol/internet protocol (TCP/IP). To provide substantially real time streaming media, such as in the case of audio or video conferencing, a voice over internet protocol (VoIP) may be used in a packet switched network. VoIP provides a number of conventions for handling real time communications in a packet switched network to obtain a relative quality of service for communications.

As used herein, the term "video" is intended to refer to media that may include a combination of audio and image representations, where the image representations may be frame oriented media, such as is available in the MPEG2 (Moving Pictures Expert Group) standard for coding of moving pictures and associated audio information. VoIP may be used to provide video services, such as video conversations, video conferencing and video broadcasting, as well as other services available over a packet switched network, such as message or file exchange, for example.

When two end users engage in a discussion over a packet switched network using VoIP, whether as a voice-only or a video communication, the parties often wish to share information that is not well suited to the communication method in use. For example, contact information is often exchanged between parties in a conversation by interrupting the discussion to verbally share such specifics as email or instant messaging (IM) addresses. The verbally communicated email or other address or contact information sometimes results in unsuccessful communication of the information due to misinterpretation of the verbally exchanged contact information.

Some video media offers the feature of a selectable link presented to the end user. Generally, the selectable link is static in nature, and often incorporated as part of the media or media stream. An end user can select the link to cause an action to occur as specified by the link. For example, the selected link may direct the end user to a particular web page or other internet site where information may be automatically obtained or exchanged in response to the selection of the link. Because the link does not change, and is not generally provided by an end user, such a facility is less useful for real time communications or updates to the media content or presentation.

SUMMARY

The disclosed system and method provide a facility for a media overlay with a dynamic content. The overlay can present to an end user a prompt or other indicia that can be used to indicate an available selection to permit end users to share information while receiving or sending video data, such as in a video conversation. The available selection may be in the form of a link, such as a hyperlink, that can be selected by an end user to take action indicated by the content of the link. The overlay may be modified based on various criteria while the underlying video is being presented on the end user device. For example, the representation or content of a link can be prepared or modified in an overlay and the overlay or overlay updates can be sent to an end user device. The prompt or other indicia may be represented by audio or image information in the form of instructions or "clickable" targets, such as icons or hyperlink text, for example. A content of information in the link can be dynamic, so that activation of the link, such as by keystroke entry or cursor selection (mouse click), can result in different actions, depending upon the content of the link. The prompt or indicia associated with the link may change in appearance as presented to the user. One or more flags may be provided to indicate that a new prompt or indicia, or new content for a link is available. The prompt or indicia, as well as the link or link content, may be provided as an overlay represented as a media layer provided in addition to the video media, or it may be embedded in the video media itself.

According to an exemplary aspect of the disclosed system and method, dynamic link data can be provided to a communication device during a communication session through a communication or packet-based data network. A user with an endpoint device coupled to either such network can provide an indication during the communication session that the dynamic link data is to be provided to the communication device. In one exemplary embodiment, the dynamic link data defines a dynamic link representation and a dynamic link executable attribute. The dynamic link data may be prepared in an overlay that can be provided to another endpoint device, and the overlay can be sent to the endpoint device. A user at the receiving endpoint device can activate the dynamic link data in the overlay to execute the action defined by the dynamic link executable attribute.

The dynamic link data can be modified during the communication session, or new dynamic links or overlays can be formed and/or provided to one or more endpoints. Various flags or criteria status for the communication devices, communication sessions or parties can be used to enable or disable various aspects of the disclosed system and method. For example, dynamic links or overlays may be enabled or disabled for a communication session, certain endpoints, certain users or certain devices. The disclosed system and method provide a way of determining if a dynamic link is selected or is to change characteristics, such as though the implementation of a state machine, an event driven mechanism or a polling mechanism.

When a dynamic link is selected, the resulting communication messages, such as packets in a packet switched network, may have a lower relative priority than the underlying video communication. The different priority levels help to maintain a certain level of video communication quality for the user experience.

The dynamic link data representation may be formed using various techniques. For example, two pixel coordinate points may be used to define a rectangle that an end user can select to activate a dynamic link. A pixel map may be used where an area is defined using two pixel coordinates per pixel row. A pixel matrix may be defined where activation of a cursor anywhere on a defined pixel causes the dynamic link to be activated.

Other features, functions, and aspects of the invention will be evident from the Detailed Description that follows.

BRIEF DESCRIPTION OF THE DRAWINGS

The disclosed system and method are described in greater detail below, with reference to the accompanying drawings, in which.

DETAILED DESCRIPTION

Figure 1:
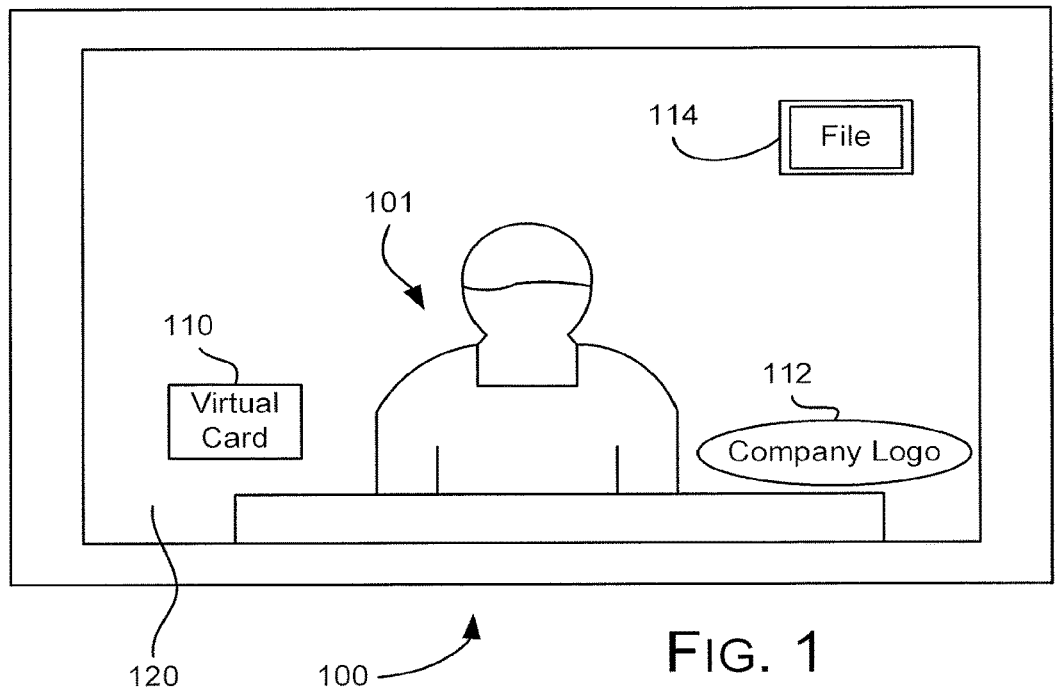
FIG. 1 is an illustration of a communication device having a display showing overlays with dynamic links in accordance with an exemplary embodiment of the disclosed system and method.

The disclosure of U.S. patent application Ser. No. 12/420, 392 filed Apr. 8, 2009 entitled SYSTEM AND METHOD FOR IMPLEMENTING A DYNAMIC MEDIA LINK is hereby incorporated herein by reference in its entirety.

The disclosed system and method provide a facility for a dynamic link that can be implemented in a media overlay. The dynamic link provides a prompt, representation or other indicia to indicate a link that can be activated upon selection to permit end users to obtain or share information while receiving or sending video data. The term "overlay" is used herein to refer to the facility for providing video or image or other media representations of links, independent of the underlying video stream, or embedded in the same. The dynamic link in an overlay, which can be a hyperlink, for example, has a dynamic content that can change over the course of a receiving or sending video data, which can occur during a video conversation, for example. A video conversation, such as a video conference or video call, consists of one or more video streams transmitted between endpoints that have video display capability.

The term "dynamic link" is used herein to refer to a program or data construct that permits execution of a given action upon selection. The dynamic link is a data construct that accommodates dynamic link data, which can be modified before, during or after a communication session that may use the dynamic link. The dynamic link may be composed conceptually of at least two portions, a dynamic link prompt, representation or indicia (used herein interchangeably) and a portion having attributes or instructions for actions to take upon selection or activation of the dynamic link. The dynamic link representation and/or execution content can be modified dynamically. The dynamic link prompt can be used to inform a user of the existence of, or the way in which, the dynamic link may be selected for execution. The executable portion can have attributes that define an action to take when the dynamic link is selected for execution. The two portions are referred to collectively herein as a dynamic link, with the content being referred to as dynamic link data. An exemplary implementation of a dynamic link can be provided through common communication applications that use hypertext transfer protocol (HTTP) links, which include text or image representations describing the link, and link attributes describing the action taken when the link is selected for execution, such as with a mouse click or by touching the indicated area on a touch-enabled video screen.

The dynamic link in the media overlay provides a prompt, representation or other indicia for a link that can be visible on top of displayed video. The dynamic link may be represented by audio or image indicia in the form of prompts or instructions or "clickable" targets, for example. The dynamic link representation can be enabled or disabled, so that the link is made available or unavailable to the end user. A content of the dynamic link can change, so that the dynamic link representation may change, and selection of the dynamic link can result in different actions or responses. One or more flags may be provided to indicate that a new dynamic link or new content for the dynamic link is available. The dynamic link may be provided through an overlay represented as a media layer provided in addition to the video media, or it may be embedded in the video media itself.

FIG. 1 illustrates a communication device 100 that permits an end user to communicate with another end user through another communication device (not shown). The communication may be real time communication or in the form of recorded messaging, such as video or voice mail, for example. Device 100 includes a display 120 that presents the end user with a visual image that may include elements of video, graphics, text links, menus or any other type of image information that maybe presented to an end user. The video portion presented on display 120 may include an image 101 of another end user engaging in a video conference with the end user that is viewing display 120. The video may include audio and image information that permits communication between the end users.

Figure 6:
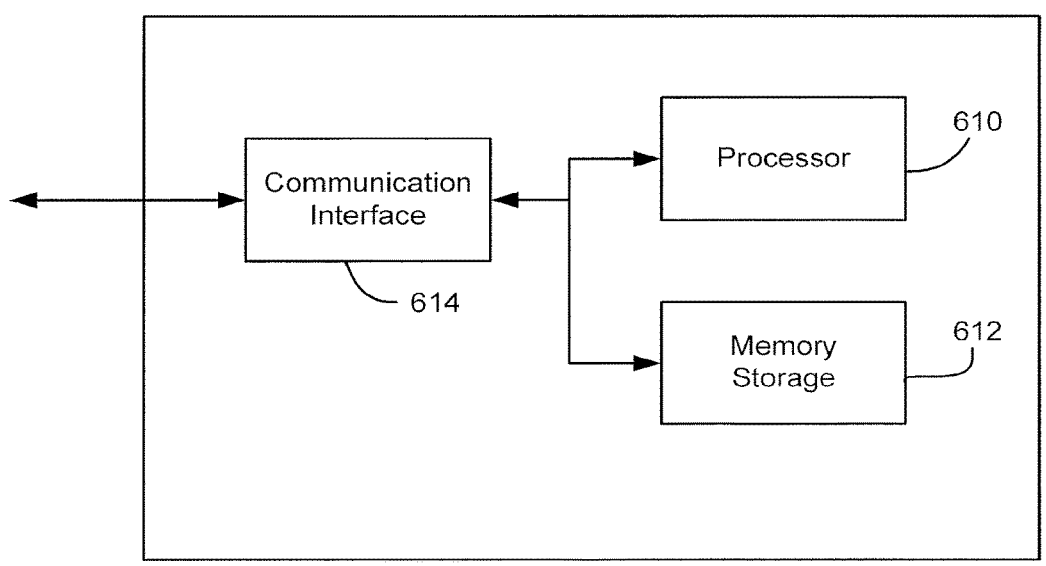
FIG. 6 is a highly diagrammatic block diagram of a media processing system.

Referring for a moment to FIG. 6, a highly diagrammatic block diagram of a media processing system 600 is illustrated. System 600 may be implemented as communication device 100, and/or may be implemented as server 420 illustrated in FIG. 4, which is described in greater detail below. System 600 includes a processor 610 that can receive and execute instructions from an application software program to carry out various functionality related to media processing. A memory storage 612 is connected to processor 610, and can store the application software program instructions for retrieval and execution by processor 610. System 600 also includes a communication interface 614 that is connected to processor 610 and memory storage 612 in the exemplary embodiment illustrated in FIG. 6. Communication interface 614 provides access to a communication network (not shown) for system 600. In an exemplary embodiment according to the disclosed system and method, communication interface 614 can send and receive media data that can be manipulated by processor 610, and/or stored and retrieved with memory storage 612. The media data may be in the form of a video conference or conversation, and may include dynamic link data in accordance with the disclosed system and method.

Referring again to FIG. 1, communication device 100 may include dynamic link representations in the form of various prompts that indicate the availability of a selection for activating a dynamic link. For example, display 120 may provide visual prompts in the form of symbolic information that represents dynamic, selectable links that may be used to transfer information upon selection by an end user. An icon 110 represents a virtual card (vCard) link that provides contact information for an end user represented by image 101 when selected by the viewing end user. Another icon 114 represents a link for a file that may be downloaded or emailed, for example, upon selection by the viewing end user. Yet another icon 112 represents information about a company that may be associated with the end user represented by image 101. Selection of icons 110, 112 and/or 114, such as by a mouse click or keystroke entry, can prompt the action of a file download, email, redirection to a website, or any other type of activity that can be implemented with the activation of a hyperlink. For example, an additional or substitute video stream can be initiated on communication device 100 by selection of icons 110, 112 or 114.

Icons 110, 112 and 114, and any additional icon(s), individually and collectively represent dynamic, selectable links that are provided to an end user through display 120, a content of which may change according to various criteria, over the course of a video conference involving the end user represented by image 101, for example. Icons 110, 112 and/or 114 may be selected according to any typical convention, such as through activation of a pointer hovering over icons 110, 112 or 114. Icons 110, 112, or 114 may also be selected through a sequential focus feature, where the focus of display 120 is moved from display item to display item in a sequential chain upon activation of a given control, such as a thumbwheel or tab key. The item with the current focus can be selected to activate the link associated with the item.

Figure 2:
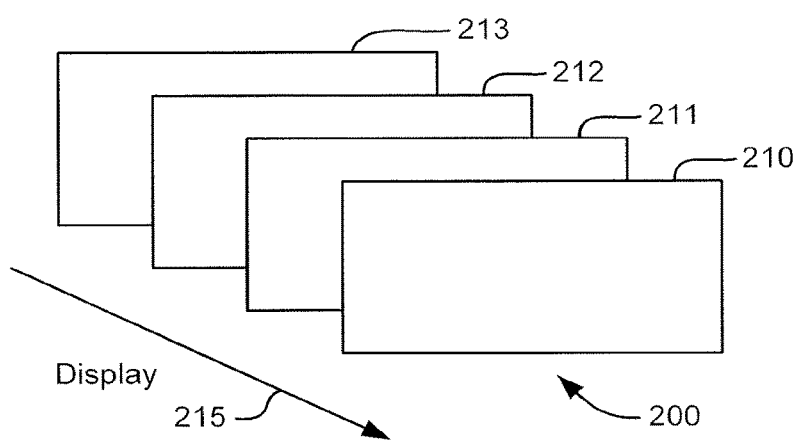
FIG. 2 is an illustration of conceptual implementation of video overlays.

Icons 110, 112 and 114 may be presented through overlays that can be independent of the underlying video that carries image and audio information involving video communication with the end user represented by image 101. Referring for example to FIG. 2, a number of blocks of video memories 200 are illustrated as permitting overlay video information to be displayed over an underlying video presentation. In FIG. 2, a video memory block 213 may represent the underlying video presentation that supports a video conference in relation to the end user represented by image 101. For example, video memory block 213 may store image data related to video communications for presenting image 101 on display 120. Another video memory block 212 may be used to store an image representation of icon 114 presented on display 120. Yet another video memory block 211 may be used to store image data related to presenting icon 112 on display 120. Still another video memory block 210 may be used to store image information related to displaying icon 110 on display 120. Each of the contents of video memory blocks 210-213 is overlaid on each other and is provided to display 120, resulting in the image data illustrated in FIG. 1, for example. An arrow 215 shown in FIG. 2 illustrates the overlaying of video memory blocks 210-213, resulting in the representations on display 120 of FIG. 1.

Video memory blocks 210-213 may be tailored to a suitable size and location for storing and presenting any one or more of icons 110, 112 or 114, and/or additional icons, on display 120. In addition, any of video memory blocks 210-213 may include more than one image representation, such as in the case of representing several of icons 110, 112 or 114 in a single video memory block. The concept of an overlay for presenting video information is well known to those skilled in the relevant art. The arrangement of video memory blocks 210-213 can be provided to permit the underlying video, conference or conversation image data to be provided in a single video memory block, while overlay information can be presented independently in other video memory blocks. Because the underlying video and the dynamic link data are independent of each other, the underlying video media stream may remain unmodified while dynamic link representations are presented on display 120.

In accordance with an exemplary embodiment of the disclosed system and method, the underlying video stream may be modified to include dynamic links that may be presented to the end user on display 120. The dynamic links may be incorporated into the underlying video stream in the form of a dynamic link representation and executable link information. When a dynamic link representation is incorporated into the underlying video stream, the prompt or link indicia, as well as the executable link information itself, is encoded into the video stream as part of the underlying video. For example, when the video stream is provided in accordance with an MPEG2 codec, the dynamic link(s) provided as part of the video stream are also incorporated into the MPEG2 coded video stream.

Application software can be provided that can manage and control the video stream, and provide access to parameter values for the underlying video content. For example, the application software can provide an API with a flag parameter that can be set or reset by the application software, or potentially the video streaming data. The video codec, for example, checks the flag value to determine if new content is available for the link indicia or link content. If the flag in the API indicates new content is available, the video codec can access the new content from the application software and insert the content into the video stream to make the same available to an end user. The video codec can provide the content, in the form of link indicia or link content, in the frames of the streaming video to permit the indicia to be presented to the end user, as well as the executable link content.

Such an implementation of the disclosed system and method may involve a modification to a standard for MPEG2 video transmission to incorporate a dynamic overlay, including, for example, dynamic HTTP links, and to permit feedback, such as the capture of an event of a user selecting a link for activation. In such an instance, the video stream codec permits the dynamic overlay information to be embedded in the underlying video, and the presence of the overlay can be referenced by a flag available to the application software. For example, a flag may be included as part of the video codec that permits an overlay to be recognized as being within the transmitted video stream. The flag can indicate that the video stream codec can support dynamic overlays, to permit the disclosed system and method to be implemented as embedded within the streaming video.

Additional information can be provided through the codec to indicate the location in a display for the overlay information. For example, information defining the area and perimeter of the overlay area that is selectable by an end user can be embedded in the underlying video.

In addition, a flag may be provided to indicate whether a change has occurred with respect to a content of the dynamic link or overlay. While the video information is being presented on display 120, for example, the flag for a change to the dynamic link or overlay can be checked to determine if new information should be applied or inserted in the dynamic link or overlay. Once new information is available, the video codec is configured to read and insert the new information into the dynamic link or overlay, so that it can be available for activation when the dynamic link is selected or activated. Each of the above activities or features is also available when the overlay is provided separately from the underlying video, as discussed above.

The dynamic link and/or overlay may be changed in how it is presented to display 120. For example, the dynamic link may be presented as an icon or graphic that represents or is associated with the dynamic link executable content. The appearance of the representation of the dynamic link on display 120 may change to reflect the change in executable content that may be activated when the dynamic link is selected by the user. The application software can be used to convey the dynamic link indicia or representation changes to the codec, which can obtain and incorporate the new image data representing the dynamic link indicia into the video stream. The codec can make the new or updated dynamic link indicia or representation available in the next suitable video frame presented to display 120. According to this embodiment of the disclosed system and method, users can change dynamic link data through the application software while the video is being presented to permit another end user to receive the dynamic link or overlay representation and activate newly added or updated dynamic link executable content that is embedded in the video stream. The activated dynamic link may cause a file to be transferred, a website to be brought up on the display, a link to a website to be transferred, an email to be sent, and/or any other type of activity that may be possible through activation of a link such as a hyperlink. Each of the above-described actions is also available when the dynamic link or overlay is provided separately from the underlying video.

The content of the dynamic link that is executed upon activation can be any type of hyperlink reference, including HTTP references. For example, the following HTTP link may be activated to download a vCard when a dynamic link representation or indicia, such as icon 110 of communication device 100, is selected by the user.

http:\\www.dialogic.com\contact.vsf

When a user selects a corresponding dynamic link representation such as icon 110 in communication device 100, the above dynamic link executable content can be executed to download a vCard to communication device 100. The content of the vCard may contain contact information for the end user represented by image 101, for example. Similar responses are available upon selection of icons 112, 114, where the dynamic links are activated upon selection to provide a given response. For example, icon 112 may be selected by the user to cause the associated dynamic link to be activated to download information to the user device about the company associated with the end user represented by image 101, or to load a web page having information about a company associated with the end user. These types of actions based on execution of a link are well understood by those skilled in the art. Icon 114 may be selected to activate the associated dynamic link to cause a file to be downloaded or emailed to a device or address specified by the end user, or to load a webpage on display 120 to permit the end user to select a file for downloading or emailing, for example. The actions executed upon selection of the dynamic links represented by icons 110, 112, 114 need not be directed to communication device 100 or display 120, but can cause actions to occur with respect to other systems or devices. For example, activation of the dynamic links represented by icons 110, 112 or 114 may cause information to be sent from the end user of communication device 100 to a device or system indicated by the end user represented by image 101. Activation of a dynamic link may also cause information to be sent to or from a third party for further processing. In general, activation of a dynamic link through selection of an item on display 120 can cause any type of available messaging activity to occur, such as, for example, email, fax, IM, voice mail, postal mail, downloads, file transfers, telephone, television, or any other type of messaging that can be initiated with the activation of a link. Activation of a dynamic link may also cause an underlying video stream to pause while, for example, a web page is loaded to be displayed on communication device 100.

The dynamic link data underlying the display representations of icons 110, 112 and 114, for example, is made dynamic through a facility that determines if a new dynamic link representation or indicia should be provided in an overlay and/or if a new dynamic link executable content should be updated or provided in an overlay. The facility can determine if a dynamic link should be added or modified in any overlay based on polling or the occurrence of an event, for example. The facility may be provided in the form of application software that manages or controls a video session, such as a video conference. The application software may include an API that permits interaction between the application software and the video stream or codec. For example, the API may provide parameter locations that may be used as flags that can be checked by the video stream or video codec implementation software to contribute to implementing the disclosed system and method. A local processor, such as may be implemented as processor 610 (FIG. 6) may be provided in communication device 100, in the form of a microcontroller, for example, and may run all or a portion of the application software. Alternately, or in addition, a processor such as processor 610 (FIG. 6) may be implemented on a server, such as server 420 (FIG. 4), which contributes to handling communication between endpoints, and may be used to run all or a portion of the application software. As illustrated in FIG. 6, processor 610 is typically coupled to a memory storage 612 that is used to help run the application software. The application software and processor 610 provide a platform for permitting interaction between the dynamic links and the underlying video.

When the application software uses polling as a basis for determining if a dynamic link should be added or modified, a change flag may be used with a given overlay to indicate when dynamic link data should be changed. The application software operating in accordance with the disclosed system and method may periodically check the change flag to determine if new or modified dynamic link data is indicated. If the change flag indicates new or modified dynamic link data, the application software can provide an additional overlay, or modify the content of an existing overlay, to modify or incorporate the dynamic link data into the video provided in display 120. For example, an end user may submit a command to add or update a dynamic link in the video through application software running on a communication device 100. The command may cause the change flag to change state to indicate a dynamic link change. The application software may include an API that can receive a command or make a call to check the change flag and/or obtain the desired dynamic link data for setting up a representation for the dynamic link on display 120, for example. The interval at which the polling mechanism checks for a changed 'flag' can be changed to increase responsiveness of the alerting mechanism, or to minimize impact on the performance of the software.

The application software can provide the above discussed facility independent of how the disclosed system and method is implemented. For example, the application software may provide all of the features for the disclosed system and method through dynamic links, separately or through overlays, through flags and interaction with an end-user device or system, so that the underlying video stream is not modified. Alternately, or in addition, the application software may interact with the video codec or video stream to add or update information, such as link indicia or link content that is to be incorporated into the underlying video stream. In any case, the application software responds to input, such as user input or a predetermined event, such as time of day, the calendar date, video conference identifiers, or any other input that may be used to insert or update a dynamic link. The application software may similarly respond to user input or the occurrence of an event to take action indicated in the executable attributes of the dynamic link.

The application software may use the occurrence of an event to check for or cause a change to a dynamic link. In general, any type of user related activity or occurrence, including those within the video data stream, may be used to trigger the application software to insert or modify dynamic links for presentation at an end user device. When a video stream reaches a predetermined point in being displayed at an end user device, such as communication device 100 for example, a module in the application software, or video codec or video stream, can be configured to recognize the event and retrieve a dynamic link to be presented to an end user, such as on display 120, for example. Events upon which action may be taken are any that can be recognized by device 100, such as, for example, selection of a dynamic link by an end user, a particular time or date being observed, an event caused by selection of a dynamic link, a predetermined point in a video or audio stream, including prerecorded ones, the selection or display of a particular web page or a web site, or a change being made to another dynamic link, as non-limiting examples. Once the software module recognizes the event, a given dynamic link can be added through the introduction of a new overlay containing the dynamic link, or a dynamic link can be modified in a current overlay, including the deletion of a link or an overlay.

In addition to polling or event-driven mechanisms, the disclosed system and method may use a state machine to determine when a new or modified dynamic link is to be implemented. Any type of mechanism known to those of ordinary skill in the art for indicating a dynamic link is to be added or modified during a communication session may be used within the disclosed system and method.

According to one exemplary embodiment of the disclosed system and method, the dynamic link can be prompted to be formed at the outset of a video stream connection being made, or while the video stream is in progress. The application software responsible for controlling or managing the video stream, such as in the case of a two-way video conversation or conference, may include an API to prompt an end user to indicate a dynamic link for inclusion in the video. The dynamic link data can be downloaded or transferred, such as by FTP, various IP conventions or protocols, or email, for example, by the application software. When the end user indicates the desired dynamic link to be provided during the video stream connection, the API uses the dynamic link data to form a dynamic link presented to one or more end user devices in an overlay, for example, that is implemented outside of the video stream band. By being outside the video stream band, widely available video stream codecs or standards may be used without modification. For example, additional software that is customized for each user device for realizing dynamic links can be avoided, since an overlay is provided independently of the video stream band.

An end user can select the dynamic link representation presented in an overlay to execute the underlying action indicated by the dynamic link execution attributes provided by the initial end user. The API may prompt an end user to supply information for the content of a dynamic link, such as a file location, vCard location or information, website or webpage, or any other type of information that can be used to provide the content of a dynamic link such as a hyperlink, for example. The prompt may be in the form of a directory-file selection list box (not shown), as is commonly used to select file and/or location information. When an end user selects the link, for example, by "clicking" on the link representation, the underlying link content is executed to provide the desired response that is dynamically specified by the end user providing the link. Multiple end users may submit or receive a link during, for example, a broadcast or multiple user video session or video conference, or when receiving pre-recorded video content.

In an exemplary embodiment of the disclosed system and method, an overlay for a video stream provided to an end user carries identification content. The identification content for the overlay may include any type of information useful for identifying an end point destination for the overlay or a relationship with the end point or end user. The identification information may also indicate an originating caller or initiation point for the call, or a relationship with the originating user or originating end point. The identification information permits the overlay to be tested to determine if the overlay is acceptable to the called party or the end point receiving the overlay.

For example, the overlay identification information may include the identification of a calling party or the identification of a called party. If, upon sending the overlay to the specified destination, the identification information does not match, or is unacceptable to the destination end point or called party, the overlay transmission may be terminated. For example, if the information does not match the called party information, the overlay transmission may be terminated. If the identification criteria does match a given identification criteria at the destination end point or as specified by the calling or called party, the overlay transmission continues, for example by sending a dynamic link to the destination end point. The overlay identification information may be configured according to any type of known system for verifying or authenticating entity identifications, including matching information or using secure or encrypted identification information, as is known to those skilled in the art. For example, an end user may impose a calling filter on incoming calls to block undesired overlays. Such a filter may also permit overlays to pass to the end user or end point destination if the calling party information is provided on an exclusivity list. In addition, the overlay identification information can be enabled or disabled by end users so that no selectable dynamic link representations appear on a display of an end user device during a video call when the overlay is disabled. End users may also be prompted to enable or disable a given overlay to permit or prevent dynamic link representations in an end user display.

Figure 3A:
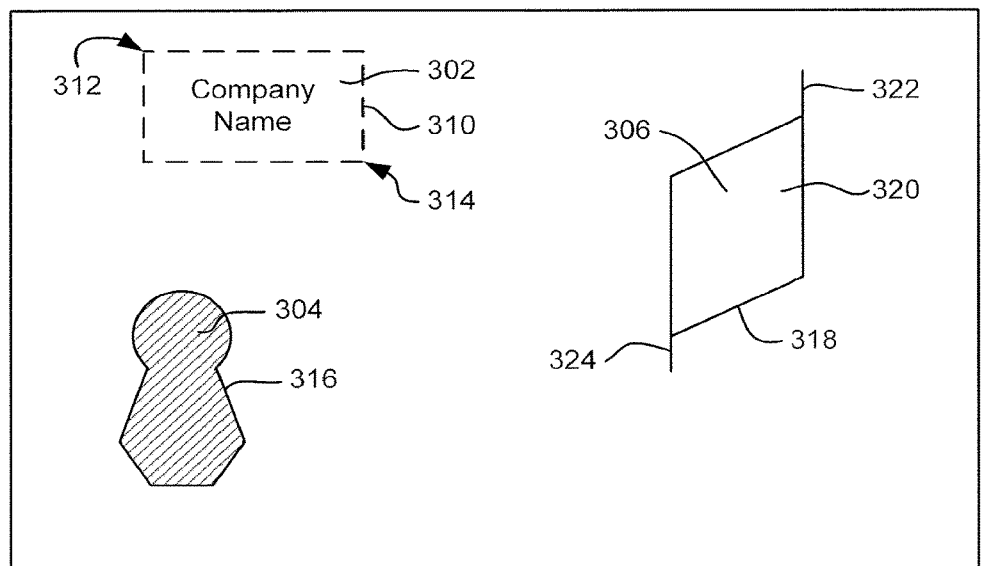
FIG. 3a is an illustration of various dynamic link representations in accordance with an exemplary embodiment of a the disclosed system and method.

Upon the establishment of a connection for a video call, once the calling or called party has optionally satisfied arbitration or identification criteria, the overlay information providing a dynamic link representation or indicia to an end user may be transmitted. Referring to FIG. 3*a*, a display 301 is shown for an end user communication device with overlay information in the form of a pixel map 302, 304 or 306. For example, pixel map 302 may be in the form of a rectangular area 310, such that two coordinate points 312, 314 define the rectangular area. By a user "clicking" within the rectangular area defined by the two coordinate points 312, 314, the underlying dynamic link content is activated. The two coordinate points 312, 314 defining rectangular area 310 may be opposing corners of the rectangle that are used to define a "clickable" area on display 301.

Alternately, or in addition, pixel map 304 may be used to provide a link representation or indicia as a custom defined shape 316. Shape 316 can be a representation of a link defined by two pixel points per pixel display row. The two pixel points define coordinate points in each row of pixels, between which a "clickable" area is determined. The two pixel points per row that define shape 316 may also be included in the clickable area. The two coordinate points 312, 314, as well as the perimeter of rectangular area 310 that they define may likewise be included in the clickable area of pixel map 302.

Another custom defined shape 318 that forms pixel map 306 may also be provided, where any pixel defined by shape 318, including pixels located within a boundary area such as area 320, may be used to determine a clickable area. For example, single pixels arranged contiguously, such as those indicated at lines 322 and 324, may be used to define a clickable area.

Figure 3B:
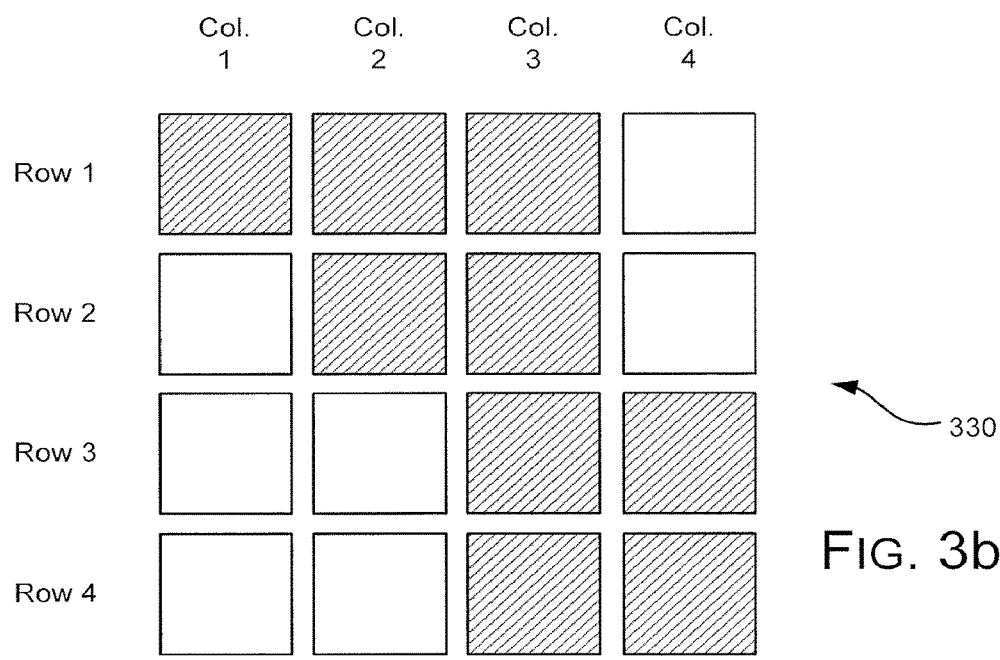
FIG. 3b is an illustration of a pixel matrix for a dynamic link representation in accordance with an exemplary embodiment of the disclosed system and method.

Referring to FIG. 3*b*, a matrix 330 illustrates a pixel arrangement that can define a given selectable area. Matrix 330 can be used to select an underlying link when the user "clicks" on the specified shape area within the matrix. For example, matrix 330 is illustrated as having four rows and four columns, with shaded pixels that can be used to define a selectable area. The shaded pixels at coordinate point sets (1,1) and (1,3), (2,2) and (2,3), (3,3) and (3,4), and (4,3) and (4,4), for example, can be used to define the selectable area by using the above coordinate point sets as the two pixels per pixel row, as discussed above with reference to pixel map 304. The selectable area can also be defined as any of the coordinate point sets shown as shaded, which definition would include the pixels defined by the above coordinate point sets as well as the pixel located at coordinate point (1,2). This matrix coordinate system provides for each pixel between and/or including the endpoints in a pixel row to be usable as a selectable region for activating the underlying dynamic link. The limited number of pixel locations identified to define a selectable area for activating an underlying link, permits the definition of a representation of the link on a user display such as display 120, 301, with a relatively small amount of information. The relatively small amount of information used to define the representation that a user may select to activate an underlying dynamic link reduces an amount of data transmitted within the application software responsible for the management of the video streams.

A clickable or selectable area of a display may also be provided as a negative of the above-described pixel maps, so that selection outside of the pixel map activates a dynamic link. A dynamic link clickable or selectable area may also be implemented as a section of the display, such as a lower half, for example.

As discussed above, the dynamic link representation or content can be changed during a video transmission, for example during a video conference. The application software may implement, for example, a state machine, polling mechanism or event driven mechanism to determine if a dynamic link is to have the representation or executable content information changed. Upon determining that a dynamic link representation or content is to change, the application software can retrieve new layer information for the overlay and update the corresponding dynamic link representations or dynamic link content. The new overlay information can then be presented on an end user device and made available for selection by the end user.

The mechanism in the application software used to determine that a change is to be made to the dynamic link is configured to avoid relatively high amounts of processing of information to prevent a negative impact on the underlying video streaming content. For example, when the mechanism implemented as a state machine, a change of state to indicate a change for a dynamic link or overlay can occur with a single instruction in the application software and/or a processor executing the application software. In the case of a polling mechanism, the checking of a flag is relatively fast and consumes a relatively small amount of processing time. With an event driven mechanism, the application software responsible for making the change is directly activated when a change is indicated. Other measures may be implemented to process dynamic link changes so that any impact on the underlying video streaming quality and presentation to the end user can be managed appropriately.

In addition, when a user activates a dynamic link, the application software reads the dynamic link content and causes execution of the same. Execution of the dynamic link content may cause the application software to employ a communications protocol, such as HTTP, for example, in a connected communications network, to request information or take action in accordance with the dynamic link content. In a communications network permitting the use of an HTTP protocol, the application software may exchange a number of packets with a network device, such as a server or workstation, to cause the dynamic link content to be executed. The application software can associate a low priority with packets that are exchanged as a result of the execution of a dynamic link. The activation of a dynamic link by an end user can thus avoid a detrimental impact on the video stream or video call to maintain a certain level of quality for the video observed by the end users. For example, the dynamic link can be configured to be a separate data session from a VoIP call to have low priority to avoid latency impact on the VoIP call. Priority or a hierarchy for exchanging packets related to execution of dynamic link content can be specified within the application software, such as at the application level, or at a router level within the communications network itself, using facilities such as quality of service techniques, which are well understood by those skilled in the art.

Figure 4:
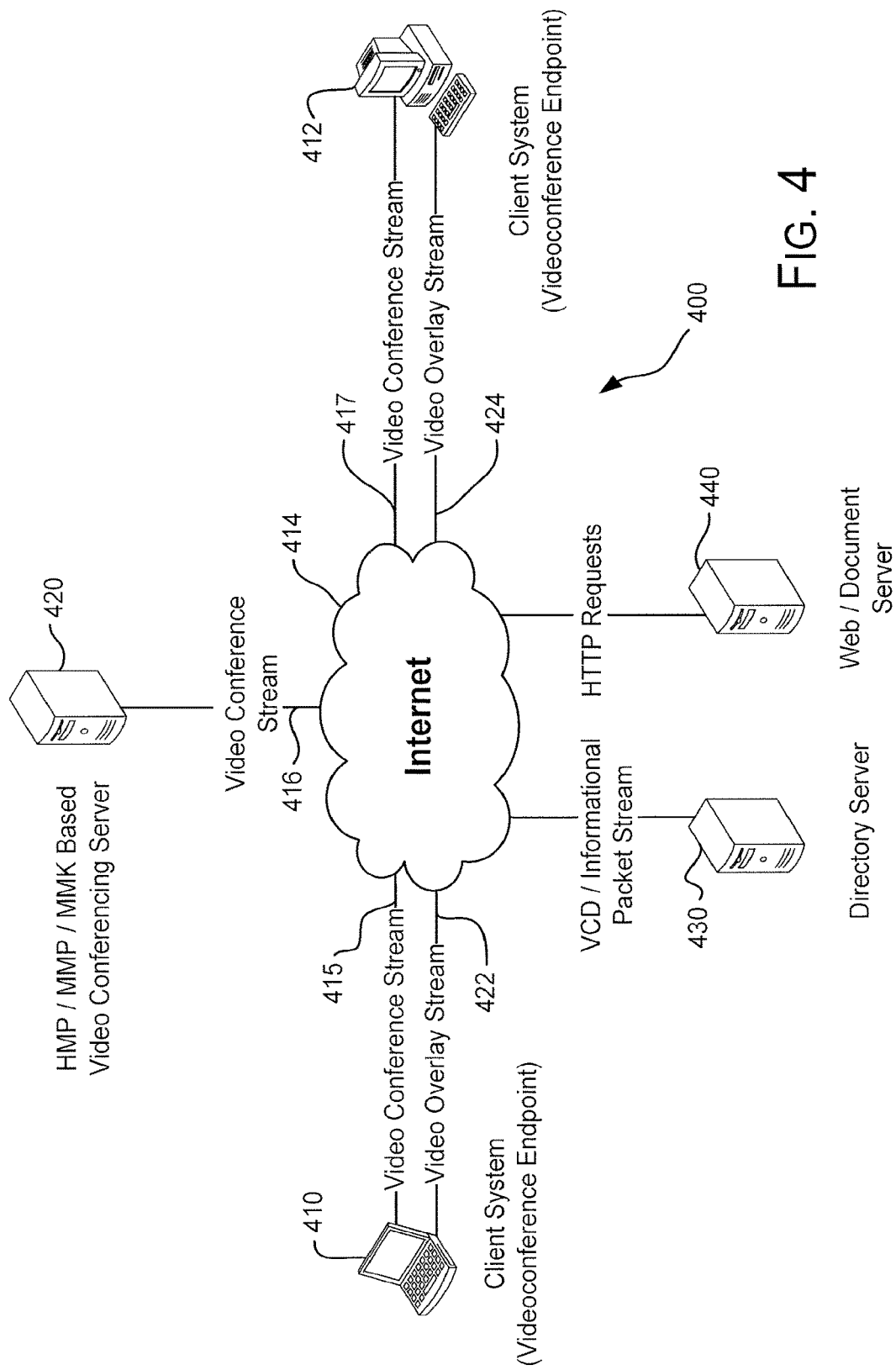
FIG. 4 is a block diagram of a communication system for implementing an exemplary embodiment of the disclosed system and method.

Referring now to FIG. 4, a block diagram of a system 400 for implementing the dynamic media overlay is illustrated. System 400 includes end user client systems 410, 412 that can send and receive media content, including video streaming to enable video communications. End use client systems 410, 412 may be implemented as any type of communication device, including communication devices that support video conferencing, such as communication device 100 (FIG. 1). End user client systems 410, 412 may house processors, which may be implemented as processor 610 (FIG. 6), which run application software that permits the dynamic link data to be presented to an end user. The media is sent and received over a communications network, exemplarily illustrated as an internet 414, which is a packet switched network. However, sending and receiving media over a communication network can also take place through a dedicated network or LAN, for example. An example of an application where media is sent or received is a video conference, which is discussed in greater detail below, it being apparent that the discussion is pertinent to any other type of media communications, such as, for example, audio, text, graphical or image media.

The disclosed system and method is also applicable to prerecorded media being presented to an end user, whether from a local source such as a media player directly accessible by a user, or provided by a remote source, such as over a communication network. The dynamic link is provided or updated during the prerecorded media session over a communication network such as internet 414. The dynamic link content may be activated upon selection in real time, if the media presentation device is connected to a communications network. The dynamic link may also be configured to be selectable at a first point in time, and activated or executed at a second point in time after a predetermined or random time interval between the first and second points in time. Generally, activation of the dynamic link is achieved through messages sent over a communications network. Accordingly, activation of the dynamic link implies a connection to a communications network involving the media presentation device.

In system 400, video conferencing is facilitated through a video conferencing server 420. Server 420 can serve as a host media platform (HMP) that can provide a multi-media platform (MMP) for advanced telecommunications computing architecture (ATCA) and a multi-media kit (MMK) for PCI express (PCIe, peripheral component interconnect express), such as are available from Dialogic Corporation of Montreal, Canada. Server 420 can also provide other services that contribute to supporting video conferencing. Video conferencing endpoints, represented by client systems 410, 412, are used to send and receive video conference data through connections 415, 417 using a protocol such as VoIP. Video conferencing messages between client systems 410 and 412 pass through or are controlled by server 420 to facilitate implementation of a remote video conference. Server 420 may house application software and a processor that runs the application software to contribute to implementing the dynamic link overlays of the disclosed system and method.

System 400 also may include a directory server 430 and web server 440, each of which is connected to a communication network to process requests from client systems 410, 412, as well as server 420. Directory server 430 can provide information to either of client systems 410, 412 as a result of activation of a dynamic link. For example, directory server 430 may provide contact information for one or more of end users in accessing client systems 410, 412. Similarly, web server 440 can respond to HTTP requests and provide services such as email, document serving, document download, web page serving and any other type of service to end users at client systems 410, 412 that is typically available from a web server. One or more of servers 420, 430 or 440 may also provide media content to client systems 410, 412. For example, servers 420, 430 or 440 may provide media content to an end user through client systems 410, 412 in response to a request from an end user. Servers 420, 430 or 440 may also provide media content to client systems 410, 412 based on the occurrence of a predetermined event, or any other activity that may be used to prompt a response from server 420, 430 or 440.

Client systems 410, 412 have connections 422, 424 for sending and receiving information related to a dynamic link. Connections 422, 424 are depicted as being separate from video conferencing connections 415, 417 to illustrate an arrangement whereby the dynamic link may be provided out of band with respect to the video conferencing data stream. With such a configuration, the information provided through connections 422, 424 can be directed to implementing the dynamic link without interfering with the underlying video provided as part of a video conference, for example. According to an exemplary embodiment, connections 422, 424 may be implemented as TCP/IP socket connections that are used to implement dynamic link operations. Connections 422, 424 permit processing of requests originating from client systems 410, 412, as well as delivery of data provided to client systems 410, 412 as part of the dynamic link implementation. For example, data as part of an update to the content of a dynamic link in an overlay can be communicated through connections 422, 424. Similarly, responses to an end user selecting a dynamic link can be provided over connections 422, 424. Dynamic link data that is used to provide a dynamic link to client systems 410, 412 may be stored on client systems 410, 412 or on servers 430, 440, for example.

Figure 5:
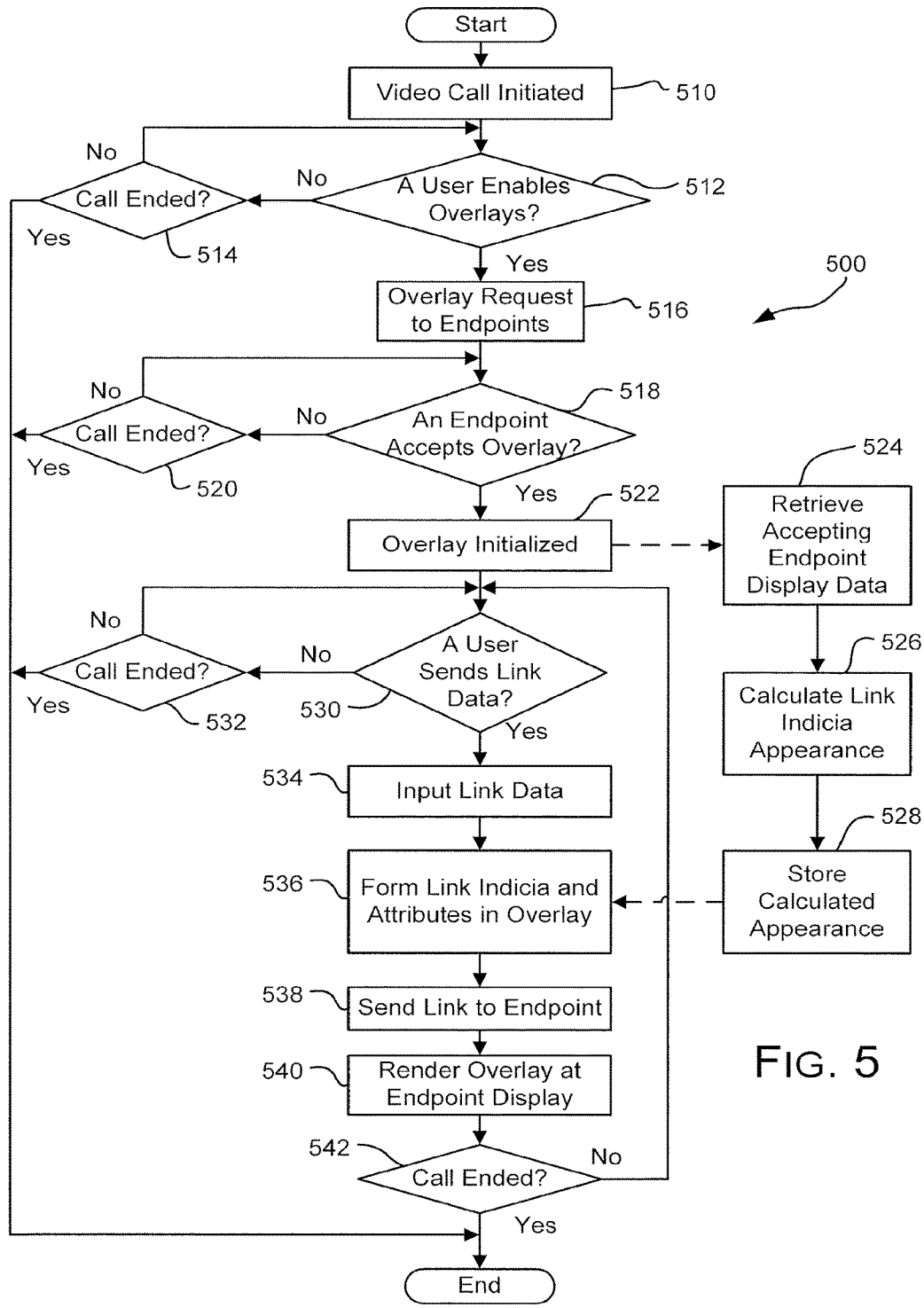
FIG. 5 is a flow chart illustrating an exemplary embodiment of the disclosed system and method.

Referring now to FIG. 5, a flow chart 500 illustrates an exemplary embodiment for processing a dynamic link implemented using an overlay in a video call in accordance with the disclosed system and method. Flow chart 500 illustrates the enablement and initiation of an overlay and the formation of a dynamic link representation in accordance with the parameters of a given display. The process of the disclosed system and method illustrated in flow chart 500 begins with the initiation of the video call in block 510. Although a video call is illustrated, it should be apparent that any type of media used in conjunction with an available connection over a communications network may be used to implement the disclosed system and method, as discussed above. With the initiation of a video call in block 510, the process determines if a user has enabled an overlay in accordance with the disclosed system and method in decision block 512. If no users have enabled overlays, the No path of decision block 512 is taken to decision block 514. In this scenario, overlays are not used in the video call. The disclosed system and method may offer the feature of enabling overlays during the video call, and decision block 514 permits additional determinations of whether overlays are enabled. If it is determined in decision block 514 that the video call has not ended, the No branch is taken to return processing to decision block 512 to determine if overlays become enabled. If decision block 514 determines that the call has ended, processing for the overlay ceases, as indicated by the Yes branch of decision block 514.

If it is determined in decision block 512 that a user has enabled overlays, processing transfers through the Yes branch to block 516, in which an overlay request is sent to one or more end points involved in the video call. In decision block 518, a determination is made as to whether any of the end points accept(s) the overlay request. If no endpoints accept the overlay request submitted in block 516, processing transfers through the No branch to decision block 520, where a determination is made as to whether the video call has ended. The disclosed system and method may be implemented to permit an endpoint device to change a setting so that overlays are accepted or rejected during the video call. Accordingly, decision block 520 indicates that processing returns to decision block 518 if the video call has not ended, as determined by transfer through the No branch of decision block 520. If decision block 520 determines that the video call has ended, processing transfers through the Yes branch, and overlay processing is terminated.

If it is determined in decision block 518 that at least one end point accepts overlays, processing transfers through the Yes branch of decision block 518 to block 522, where an overlay can be initialized. Overlay initialization can, for example, initiate a new process or process thread in the application software to check for new or changed overlays or overlay settings to permit new or modified dynamic links to be presented to an end user through an end point device, as well as to permit a response to activation or execution of a dynamic link.

As part of the overlay initialization in block 522, the application software makes a determination of display capabilities of end user devices. By having information regarding end user device display capabilities, the application software can calculate an appropriate size, location, and resolution, for example, for a representation or indicia of a dynamic link provided on a display. Any other criteria related to a display can be used to determine how an overlay should be presented, including such criteria as, for example, display height or width in pixels, a device or display bit rate and a frames/second capacity. Accordingly, the disclosed system and method can provide an appropriately sized and located display representation, such as an icon, that is tailored to the end user device, so that any end user device display may generally take advantage of the disclosed system and method. To implement this feature, a process or processing thread can be initiated as indicated in block 524, in which display data for endpoints accepting overlays is retrieved. The retrieved display data from the accepting endpoints is used to calculate the link indicia or representation appearance in the endpoint display in accordance with the retrieved display data, as indicated in block 526. Block 528 indicates the storage of the calculated appearance data for use with overlays used to present dynamic link data on an endpoint display.

After overlay initialization in block 522, processing continues to decision block 530, in which a determination is made as to whether an end user has sent or indicated dynamic link data. For example, decision block 530 determines if an end user has indicated that one or more dynamic links are to be used in the video call. If it is determined in decision block 530 that no dynamic links are to be used during the video call, processing transfers to decision block 532 through the No branch of decision block 530, where a determination is made as to whether the video call has ended. In accordance with an embodiment of the disclosed system and method, an end user may decide to send a dynamic link to another end user device, while the video call is taking place. To permit the application software to implement this feature, decision block 532 provides a No branch back to decision block 530 if the video call has not ended. By branching back to decision block 530, the application software permits an end user to provide a new or modified dynamic link during the video call. In addition, one or more end users may wish to provide several dynamic links during the course of a video call, which is permitted at least in part by the No branch of decision block 532. Furthermore, an end user may wish to delete or disable one or more dynamic links during the course of a video call, which can be achieved with a user sending or indicating dynamic link data suitable for deleting or disabling a dynamic link. The various operations that can be done on a dynamic link during a video call can be achieved through decision blocks 530 and 532, which represent a mechanism for determining when a dynamic link changes.

Once a user provides dynamic link data as determined in decision block 530, processing proceeds along the Yes path to block 534 where the dynamic link data is input. Dynamic link data may be input in accordance with any number of well known mechanisms or techniques, such as through the provision of a selection facility for choosing file references in conjunction with a particular link purpose. For example, the application software can provide the user with a display for selecting a file name to indicate a file that can be downloaded by an end user that activates the proffered dynamic link. Any type of activity that can be achieved by execution of a link, such as a hyperlink, can be implemented with the input dynamic link data provided in block 534. Processing continues to block 536, where the dynamic link representation or indicia is formed and the dynamic link execution attributes are provided in the overlay.

The formation of the dynamic link representation uses the stored calculated appearance data that can be specific to an end user display, as determined in block 528. The dynamic link representation on an end user display is specified by the user that provides the dynamic link with the input dynamic link data from block 534. The dynamic link representation is appropriately formed with an overlay that represents the configuration of the end user display upon which the dynamic link representation will be presented. The overlay also holds information for action to be taken upon selection of the dynamic link by an end user. Once the overlay is formed in block 536 with the dynamic link representation and execution attributes, the overlay is sent to one or more predetermined end points in block 538.

As discussed above, the overlay with the dynamic link is provided out of band from the underlying video stream representing the video call to permit standard video streaming techniques to be used without modification. Alternately, or in addition, the overlay can be provided in a modified video codec arrangement to permit the dynamic link data to be embedded in the video presented to an end point of the video call. In either event, the overlay is provided to one or more endpoints and presented on a display to permit an end user to select the dynamic link. The rendering of the overlay with the dynamic link representation is illustrated in block 540. With the dynamic link represented on the end user display, the application software can return to a state of checking for updates to overlays or dynamic link data. This checking state is illustrated with decision block 542, where a determination is made as to whether the video call has ended. If the video call has not ended, the No branch of decision block 542 is taken to return to decision block 530.

If the video call has ended in accordance with the determination in decision block 542, the process ends with the termination of the video call.

Although the process illustrated in flow chart 500 shows dynamic link data being input in block 534, it should be apparent that dynamic link data can be preset or preloaded at a user endpoint, for example. Alternately, or in addition, input dynamic link data can be stored at a server connected to the communication network, such as servers 420, 430 or 440. (See FIG. 4). It should also be clear that the process illustrated in flow chart 500 can be applicable to any of a number of end user devices as well as multiple end users. For example, an end user can provide a dynamic link to the display of their own communication device, which dynamic link can be modified over the course of a video call to permit the end user to adapt or access different information over the course of the video call. As discussed above, end users can set criteria for delivery of overlays or dynamic links to permit one or more end users to selectively choose other end user devices that are enabled to receive specified overlays or dynamic links, or to permit the specified overlays or dynamic links to be made visible or active on another end user's display.

It should be appreciated that the above-described dynamic overlays can be used in a number of applications involving data being presented or displayed on a communication device with which an end user can interact to activate a dynamic link. For example, personal computers (PCs) can receive video content that can have dynamic links and/or overlays in accordance with the disclosed system and method. An end user of a PC can receive and activate a dynamic link that is presented in an advertisement, a selected video, a shared video, a video on demand, a video game, or any other media that an end user might access using the PC and a connected media source, such as a network like the Internet, for example. The dynamic link data can be tailored to various criteria related to the end user. For example, the dynamic link data can be dynamically modified based on identifying the PC, an IP address, an end user profile, stored personal data, a time of media access, a duration of media access, end user preferences, end user behavior, or any other information that can be used to provide dynamic link content that changes in response to end user related criteria. The dynamic link content can be controlled by application software, a user such as an administrator, a server or router that can inspect packets, and any other type of mechanism or user that has access to the dynamic link content. For example, a dynamic link can be "pushed" to an end user communication device for use with a video presentation, including realtime or prerecorded video presentations. Dynamic links may also be enabled or permitted to be activated on a fee based schedule, for example.

As an example, an end user may access a video sharing web site using a PC connected to the Internet. Upon selection of a video, a dynamic link overlay can be provided to the PC display as part of the video presentation. The content of the dynamic link data can be modified based on end user activity while the video is presented, or based on other criteria related to the end user or the video content. For example, if the video shows a product in which the end user has previously expressed an interest, such as by providing settings in a preference profile, dynamic link data can be provided in a video overlay that permits the user to activate a link related to the product. The link may provide special offers or information related to end user criteria for a limited time during the video. It should be appreciated that many other variations and like applications and scenarios are available through the disclosed system and method.

It should be emphasized that the above-described embodiments of the present invention are possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A computer-implemented method of dynamically modifying a hyperlink presented on a user display, comprising:
    performing, by a processor running an application program out of a memory, one of overlaying the hyperlink on media content and embedding the hyperlink in the media content, the processor and the memory being included in a first communication device, the one of the overlaid hyperlink and the embedded hyperlink having an executable attribute defining a first action to be performed upon activation of the hyperlink;
    establishing a communication session between the first communication device and a second communication device, the second communication device including a user display;
    sending, from the first communication device to the second communication device, a representation of the one of the overlaid hyperlink and the embedded hyperlink having the executable attribute defining the first action to be performed upon the activation of the hyperlink for display on the user display of the second communication device;
    receiving, at the processor of the first communication device through the application software running on the processor, a first command for modifying the one of the overlaid hyperlink and the embedded hyperlink;
    in response to the first command, modifying, through the application software running on the processor of the first communication device, at least the executable attribute of the one of the overlaid hyperlink and the embedded hyperlink, the modified executable attribute defining a second action to be performed upon the activation of the hyperlink, the second action being different from the first action; and
    sending, from the first communication device to the second communication device, the modified executable attribute for updating the one of the overlaid hyperlink and the embedded hyperlink displayed on the user display of the second communication device, the updated one of the overlaid hyperlink and the embedded hyperlink having the modified executable attribute defining the second action to be performed upon the activation of the hyperlink.

2. The method of claim 1 further comprising:
    receiving, at the processor of the first communication device through the application software running on the processor, a second command for modifying the one of the overlaid hyperlink and the embedded hyperlink;
    in response to the second command, modifying, through the application software running on the processor of the first communication device, the representation of the one of the overlaid hyperlink and the embedded hyperlink; and sending, from the first communication device to the second communication device, the modified representation for updating the one of the overlaid hyperlink and the embedded hyperlink displayed on the user display of the second communication device.

3. The method of claim 1 further comprising:

performing, by the processor of the first communication device running the application program out of the memory, one of overlaying a second hyperlink on the media content and embedding the second hyperlink in the media content; and sending, from the first communication device to the second communication device, a second representation of one of the overlaid second hyperlink and the embedded second hyperlink for display on the user display of the second communication device.

4. A system for dynamically modifying a hyperlink presented on a user display, comprising:

a first communication device including at least one memory and at least one processor operable to run an application program out of the at least one memory:

to perform one of overlaying the hyperlink on media content and embedding the hyperlink in the media content, the one of the overlaid hyperlink and the embedded hyperlink having an executable attribute defining a first action to be performed upon activation of the hyperlink;

to establish a communication session between the first communication device and a second communication device, the second communication device including a user display;

to send, to the second communication device, a representation of the one of the overlaid hyperlink and the embedded hyperlink having the executable attribute defining the first action to be performed upon the activation of the hyperlink for display on the user display of the second communication device;

to receive, through the application software running on the processor, a first command for modifying the one of the overlaid hyperlink and the embedded hyperlink;

in response to the first command, to modify, through the application software running on the processor, at least the executable attribute of the one of the overlaid hyperlink and the embedded hyperlink, the modified executable attribute defining a second action to be performed upon the activation of the hyperlink, the second action being different from the first action; and to send, to the second communication device, the modified executable attribute for updating the one of the overlaid hyperlink and the embedded hyperlink displayed on the user display of the second communication device, the updated one of the overlaid hyperlink and the embedded hyperlink having the modified executable attribute defining the second action to be performed upon the activation of the hyperlink.

5. The system of claim 4 wherein the at least one processor is further operable to run the application program out of the at least one memory:

to receive a second command for modifying the one of the overlaid hyperlink and the embedded hyperlink;

in response to the second command, to modify, through the application software running on the processor, the representation of the one of the overlaid hyperlink and the embedded hyperlink; and to send, to the second communication device, the modified representation for updating the one of the overlaid hyperlink and the embedded hyperlink displayed on the user display of the second communication device.

6. The system of claim 4 wherein the at least one processor is further operable to run the application program out of the at least one memory:

to perform one of overlaying a second hyperlink on the media content and embedding the second hyperlink in the media content; and to send, to the second communication device, a second representation of one of the overlaid second hyperlink and the embedded second hyperlink for display on the user display of the second communication device.

7. A computer-implemented method of dynamically modifying a hyperlink presented on a user display, comprising:

sending, from a first communication device to a second communication device, a representation of one of an overlaid hyperlink on media content and an embedded hyperlink in the media content for display on a user display included in the second communication device, the one of the overlaid hyperlink and the embedded hyperlink having an executable attribute defining a first action to be performed upon activation of the hyperlink;

modifying, by a processor included in the first communication device running an application program out of a memory, at least the executable attribute of the one of the overlaid hyperlink and the embedded hyperlink, the modified executable attribute defining a second action to be performed upon the activation of the hyperlink, the second action being different from the first action; and sending, from the first communication device to the second communication device, the modified executable attribute for updating the one of the overlaid hyperlink and the embedded hyperlink displayed on the user display of the second communication device, the updated one of the overlaid hyperlink and the embedded hyperlink having the modified executable attribute defining the second action to be performed upon the activation of the hyperlink.

8. The method of claim 7 further comprising:

modifying, by the processor included in the first communication device running the application program out of the memory, the representation of the one of the overlaid hyperlink and the embedded hyperlink; and sending, from the first communication device to the second communication device, the modified representation for updating the one of the overlaid hyperlink and the embedded hyperlink displayed on the user display of the second communication device.

* * * * *